United States Patent [19]

Boozer

[11] Patent Number: 5,704,674
[45] Date of Patent: Jan. 6, 1998

[54] MOUNTING FOR A MANUALLY OPERABLE TOOL

[75] Inventor: James J. Boozer, Phoenix, Ariz.

[73] Assignee: Sportlite/Powermag Joint Venture, Phoenix, Ariz.

[21] Appl. No.: 421,496

[22] Filed: Apr. 13, 1995

[51] Int. Cl.$^6$ .................................. B25J 1/02; B25J 15/06
[52] U.S. Cl. .................................. 294/65.5; 294/19.1
[58] Field of Search .................. 294/2, 3, 19.1, 294/22–24, 64.1, 65.5, 66.2; 335/285, 289–291, 293; 362/102, 109, 119, 120, 253

[56] References Cited

U.S. PATENT DOCUMENTS

| | | | |
|---|---|---|---|
| 1,521,173 | 12/1924 | Catching | 294/65.5 |
| 1,875,376 | 9/1932 | Hamer et al. | 294/19.1 |
| 2,683,618 | 7/1954 | Long | 294/65.5 |
| 3,253,626 | 5/1966 | Stillwagon et al. | 294/65.5 X |
| 3,335,727 | 8/1967 | Spoto | 294/64.1 X |
| 3,582,638 | 6/1971 | Peters | 294/65.5 X |
| 3,924,115 | 12/1975 | Hampton et al. | 294/65.5 X |
| 4,208,830 | 6/1980 | Yoshida | 294/19.1 |
| 4,253,697 | 3/1981 | Acosta | 294/65.5 X |
| 4,719,826 | 1/1988 | DuBois | 294/19.1 X |
| 4,962,957 | 10/1990 | Traber | 294/19.1 |

*Primary Examiner*—Johnny D. Cherry
*Attorney, Agent, or Firm*—Gregory J. Nelson

[57] ABSTRACT

A tool, such as an electromagnetic pick-up tool, having a housing with a compartment which contains a power supply. The housing receives an elongate wand which carries a light or magnet and which is electrically connected to the power supply at terminal posts within the housing. The wand is retained from rotation by an anti-rotation lug or by projections which pinch the wand. The invention may also be used to couple other electro-mechanical components.

7 Claims, 2 Drawing Sheets

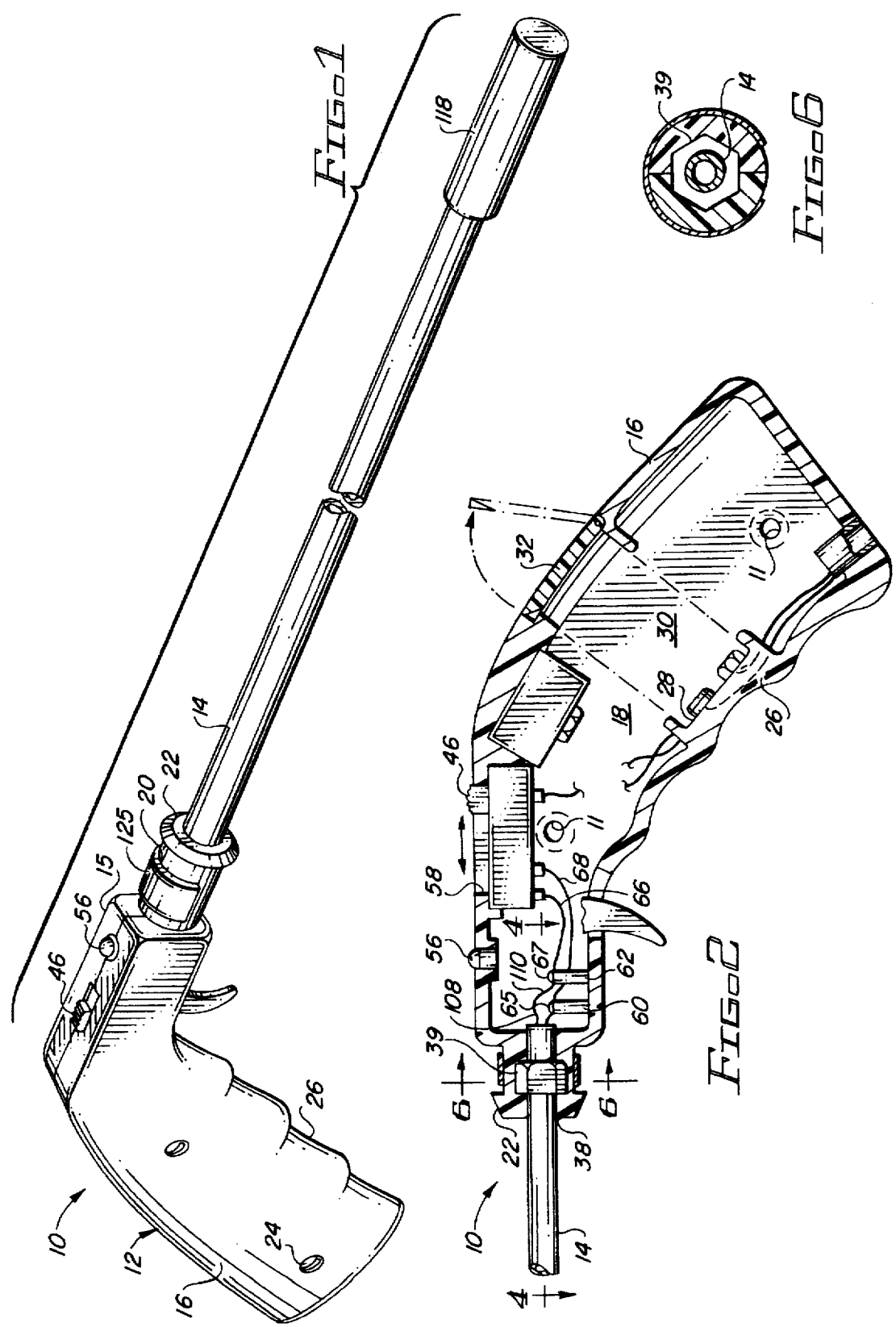

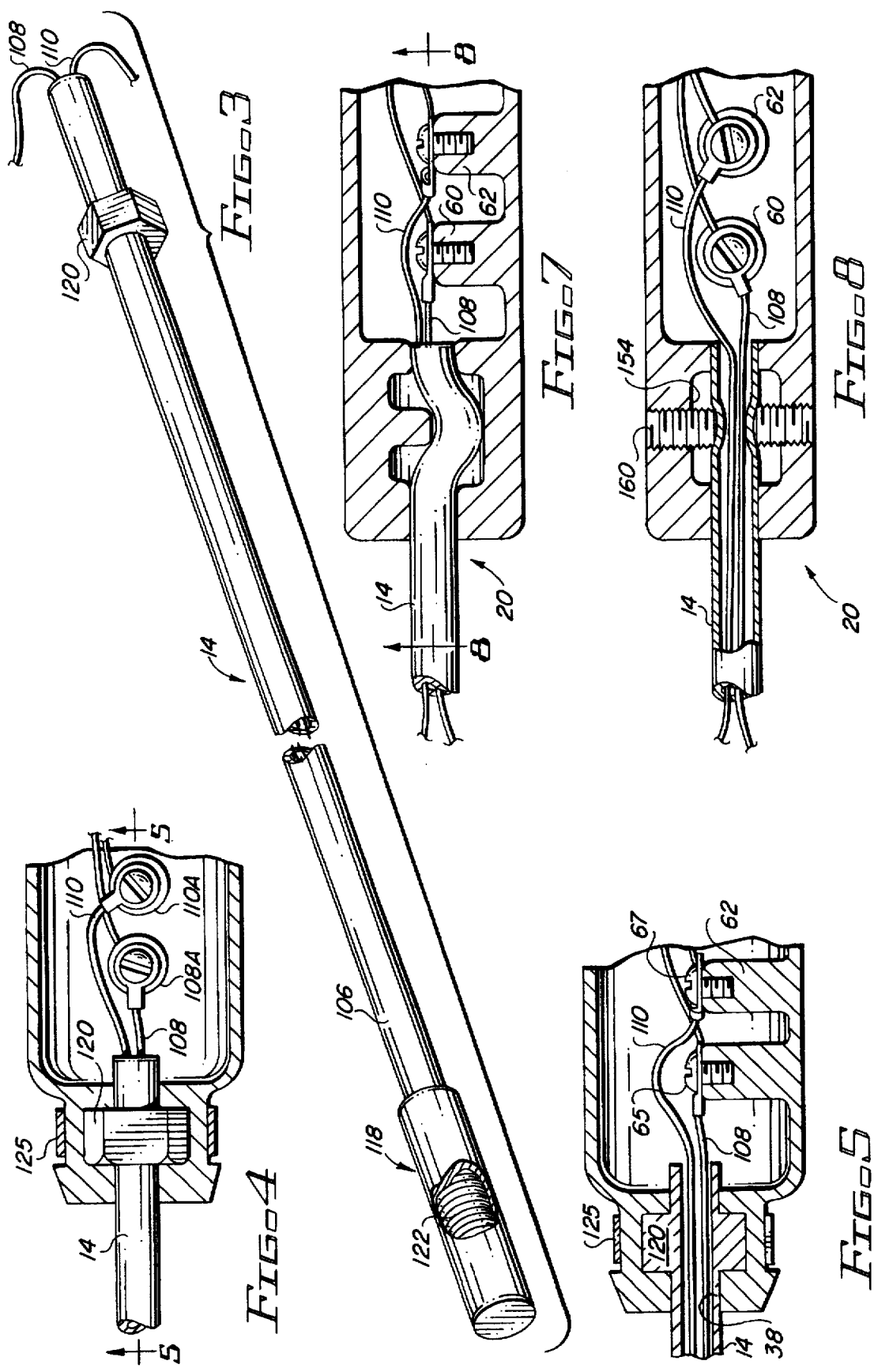

MOUNTING FOR A MANUALLY OPERABLE TOOL

BACKGROUND OF THE INVENTION

The present invention relates to a hand-held retriever tool for assisting the user illuminating, locating and engaging objects from hard-to-reach areas. More specifically, the tool is intended for use as a retrieval by mechanics. The tool has a handle containing a power source to which various accessories such as electromagnets, lights, fiber optic viewers or pick-up devices can be selectively attached at the end of a formable/deformable wand. In a broad aspect of the present invention, the invention relates to a coupling for attaching various accessories to a housing.

FIELD OF THE INVENTION

It is common when making repairs for small parts or pieces to fall into relatively inaccessible places which makes manual retrieval difficult. Automobile mechanics routinely experience difficulty in retrieving parts such as small nuts, washers, bolts or springs which lodge in hard-to-reach places within the engine compartment. Retrieval is difficult as the parts are obstructed from view and are often in locations which do not provide sufficient clearance for the mechanic to manually grasp the part. Because of this problem, various specialty retrieval tools can be found in the prior art.

Representative of these tools is the tool shown in my prior patent, U.S. Pat. No. 5,348,359, as well as the various patents referenced therein. The description of the prior art set forth in my prior patent is incorporated by reference herein. My U.S. Pat. No. 5,348,359 describes an electromagnetic pick-up retriever tool having a number of interchangeable accessories which assist the mechanic in locating, illuminating, viewing and retrieving both magnetic and nonmagnetic objects such as small mechanical parts, as for example nuts, springs, small tools and the like. The tool of my prior patent has a pistol-like grip or handle which houses a power source such as a battery and associated circuitry. The forward end of the handle has a receptacle which selectively receives various attachments such as a formable/reformable wand having an electromagnet at its outer or distal end. Lights for illuminating the work area and fiber optic viewers may be selectively attached to the device as accessory tools. The accessory tools are engaged in the handle at a receptacle which is an insert or plug-type jack or which may alternately be a twist lock or other type of releasable connector. Connectors of this type are sometimes known as RCA jacks.

The tool described in my prior patent is presently being commercialized and has met with success and gained consumer acceptance. However, it has been found in some instances it is not necessary to provide the device with a plurality of readily interchangeable wand accessories. Some users require only a single accessory such as an electromagnet located on the end of the formable/deformable wand.

Accordingly, it is an object of the present invention to provide a convenient and inexpensive means of securing an electrically operated accessory such as a magnetic wand to a handle or housing which contains a power source. The construction of the present invention avoids the use of the more expensive coupling devices such as RCA jacks described above. The device is easy to repair and provides reliable, positive electrical connections. While the device of the present invention does not provide the convenience of interchangeability as does the device of my prior patent, it does provide lower constructional cost, particularly for those users who do not require immediate interchangeability of the attached tool or wand. The construction of the present invention permits interchangeability of the tool or wands with several relatively simple mechanical operations.

Briefly, the present invention provides a retriever or pick-up tool which has a housing having a handle with a pistol-like grip configuration and forwardly extending barrel. The handle defines an internal compartment which contains a power circuit, power source, associated circuitry and a switch. The forwardly extending barrel defines an opening or aperture communicating with the interior compartment of the handle. Electric terminal posts are provided within the housing adjacent the opening. Portions of the housing are separable, as for example into two halves. During assembly, the accessory device, such as an elongate wand, is positioned in the aperture. The wand has a retaining member in the form of an enlarged over-mold section conforming to the shape of the recess in the aperture in the housing. The over-mold section seats in the aperture and the housing is assembled as a unitary structure preferably including a fastener extending about the barrel portion. Electrical connectors extending along or through the wand are attachable to the internal power source and power circuit at the internal terminal posts adjacent the inner or proximal end of the bore in the barrel end of the housing.

In an alternate embodiment, the retaining means in the barrel comprises projections which grip or pinch a deformed area adjacent the proximal end of the wand.

Accordingly, it is a broad object of the present invention to provide a means of conveniently coupling mechanical components which can be accomplished at relatively low cost. A more specific object of the present invention is to provide a tool as described above having a hand-held unit which is adaptable to receive a selected accessory or attachment at the time of assembly and which construction facilitates replacement of that accessory with a minimum of mechanical operations.

The above and other objects and advantages of the present invention will become more apparent from the following description, claims and drawings in which:

FIG. 1 is a perspective view of a preferred form of the tool of the present invention showing a housing with an accessory tool secured to the housing barrel, the accessory tool being in the form of an electromagnetic device;

FIG. 2 is a cross sectional view of the housing illustrating the connection of the accessory to the housing;

FIG. 3 is a perspective view illustrating the construction of a representative accessory tool having electromagnet associated with a wand;

FIG. 4 is a cross sectional view taken along line 4—4 of FIG. 2;

FIG. 5 is a cross sectional view taken along line 5—5 of FIG. 4;

FIG. 6 is a cross sectional view taken along line 6—6 of FIG. 2;

FIG. 7 is a cross sectional view similar to FIG. 5 showing another form of the wand retaining construction; and FIG. 8 is a cross sectional view taken along line 8—8 of FIG. 7.

Turning now to the drawings, particularly FIGS. 1 to 6, the present invention is generally designated by the numeral 10 and consists of a housing having two principal components including a grip or housing 12 and an elongate accessory tool 14 which may be of various types. The accessory tool 14 is shown as an electromagnetic retrieving device but, as will be explained, may also consist of other types of devices such as a light or illuminating device.

The housing 12 is preferably molded from a suitable impact-resistant material such as ABS plastic. The housing has a handle or grip portion 16 and an upper body portion 15 which define a hollow interior compartment 18. Preferably the housing, as indicated, is molded in two mating sections. Each of the mating sections includes internal bosses 11 within the compartment 18 so that the handle may be joined at the bosses by suitable mechanical fasteners such as screws 24 as shown. This allows the handle to be easily assembled or disassembled for convenience of attaching the accessory tool 14 or replacing the tool 14 or for making repairs. The forward end of housing section 15 has a forwardly extending barrel 20 which terminates at a flange 22. The tool 14 is retained within the barrel 20.

The rear surface of the grip 16 is smoothly curved and the forward end of the grip defines a plurality of recesses 26 configured to receive the fingers of the user similar to the construction of a pistol grip. A seat 28 is integrally formed within compartment 18 to receive a battery 30 which is shown as a conventional nine volt battery. Access to compartment 18 is via battery access door 32 which is hingedly secured to the rear surface of the grip. Alternatively, the battery access door may be provided at the butt end of the grip. An important feature of a tool of this design is that the grip is not axially aligned with the accessory tool but rather the axis of the handle or grip 16 forms an acute angle with respect to the normal undeformed axis of elongate tool member 14. This arrangement provides significant advantages of operation including ease and manipulation and improved user visibility.

The cylindrical barrel 20 is adapted to receive the inner or proximal end of the tool 14. The barrel defines an axially extending bore 38 which communicates with the internal compartment 18. Retention means in the form of an annular recess 39 extends about the bore 38 within the area defined by the barrel. The recess 39 preferably has a cross sectional shape which as seen in FIG. 6 is hexagonal but may be any convenient geometric shape which seats or receives the enlargement or lug 120 on the proximal end of the attachment tool to retain the tool from twisting and turning. Thus, the enlargement on the tool cooperates with the seat in the barrel as an anti-rotation and retention means.

A circuit board 58 is mounted within compartment 18 and contains circuitry for the various electrical circuits such as the battery test circuit, power circuit and switching circuit. It is not necessary to set forth the details of the electrical circuitry which are set forth and incorporated by reference in U.S. Pat. No. 5,348,359. It is sufficient to note that the electrical circuit includes a mode switch 46 which allows the user to energize the attachment tool 14 and select the desired operational mode. Operation of the slide switch to the "off" position to a selected mode will also energize the light emitting diode 56 which provides an indication of the level of the battery voltage. Turning the switch 46 to the "on" position will also complete electrical circuit to terminal posts 60 and 62 via conductors 66 and 68. Posts 60, 62 are integrally formed within the housing portion of compartment 18 and each post has conductive screws 65 and 67, respectively, to which conductors 66, 68 are attached.

The attachment tool 14 is shown in FIG. 3 and includes an elongate body 106 which is termed a "wand". The wand is relatively stiff so as to support an article during retrieval but also has the characteristics of being formable/deformable so the device may be configured to extend into hard-to-reach locations. Coaxially disposed around the distal end of the wand 106 is electromagnet 118 which includes a core of ferrous material about which is disposed a coil 122. The electromagnetic coil 122 is connected to conductors 108 and 110 which, when energized, will create a magnetic field about the end of the coil. When the switch 46 is placed in the on position, electrical current will energize the coil 122 via conductors 108, 110 which are respectively attached to terminal posts 60, 62. Conductors 108, 110 are suitably sized copper wire. The electromagnetic field established by energization of the magnet may be used to attract magnetic objects to the electromagnet.

The elongate wand permits the magnet to be configured so that it may be inserted into otherwise hard-to-reach places. The orientation of the grip with respect to the wand facilitates the use of the device by the user sighting along the wand to retrieve the object. The wand may be protected with suitable elastomeric or plastic sheath.

When the device of the present invention is assembled, the wand with the suitable retention lug 120 is configured as shown in FIG. 3 with conductors 108, 110 attached to the electromagnet. The terminal ends of conductors 108, 110 may be provided with suitable solderless clamp terminals 108A, 110A. The inner or proximal end of the wand is secured between the sections of the handle with the lug 120 seated within the recess 39. The terminals 108A, 110A are secured to terminal posts 60 and 62, respectively. It is noted that conductors 66 and 68 are also connected to the terminal posts 60, 62. The screws 65 and 67 are tightened to secure the conductors in place. The mating sections of the housing are secured together by tightening fasteners 24. For further stability, a clip 125 which is a C-shaped spring member, is secured about the annular exterior of the barrel to retain the housing components together and to retain the anti-rotation lug in place. Other mechanical connectors such as screws may also be used.

FIGS. 7 and 8 illustrate the barrel section of an alternate embodiment of the present invention in which like numerals have been used to designate elements similar to those shown in previous figures. The barrel 20 defines an axially extending bore 38 which receives the inner or proximal end of the wand 14. Terminal posts 60 and 62 are electrically connected through the switch, not shown, to the power source. The description of other elements not shown are the same as those described previously and are not repeated here.

The inner end of the wand has an annular area 150 of reduced cross section which is also axially deformed as seen in FIG. 7. The bore in the barrel includes a retention means 154 which may be annular or in the form of several post-like projections which engage and "pinch" the wand 14 in the area 150 and retain the wand in position. Conductors 108 and 110 extend from the wand to the posts 60 and 62.

The opposing, mating sections of barrel 20 are joined by mechanical fasteners 160 shown as self-tapping screws which permit disassembly, if required.

The resulting construction is an easily fabricated, easily assembled device. While the device of the present invention does not have the convenience of interchangeability as does the device shown in my U.S. Pat. No. 5,348,359, the present invention provides an economical alternative to manufacture of a device of this general type when convenience of immediate interchangeability of the tool is not required. As indicated above, original assembly is quick and convenient.

If the user does desire to change the tool 14 to some other type of tool such as a wand having an electromagnet of greater size or a wand having a light or some functional device, the change-over can be readily accomplished. This is done by removing the clip 125 and loosening the fasteners 24 so that the sections of the housing separate. The terminal screws 65, 67 are loosened so the conductors 108 and 110 may be disengaged. The tool 14 can then be removed and a selected tool having a proximal end configured as shown in FIG. 3 may be inserted into the handle with the anti-rotation lug 120 engaging the seat in the barrel of the handle. The electrical conductors of the replacement tool are appropriately connected to the terminal posts 60, 62. Final assembly includes securement of the handle sections together by fasteners 24 and placement of clip 125 about barrel section 20.

While the foregoing describes a retriever tool with provision for mechanical and electrical coupling of a tool, the invention is broader in that it comprehends coupling of other types of devices in the manner described. For example, the coupling in this manner could be the coupling of an electrical conduit to a housing in which the conduit would have retention means and the housing would include the terminal posts for electrical connection of conductors extending within the conduit. With the housing portion being separable and secured by fasteners such as screws or clips, repair or replacement of a coupling arrangement of the general type described can be accomplished with facility.

The present invention provides a unique and highly adaptable and versatile coupling arrangement which is particularly useful in connection with the retriever tool described herein.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A tool comprising:
   (a) a housing having separable portions defining an internal compartment, said housing having a grip shaped to be grasped by the user disposed at an angle with respect to a barrel section;
   (b) said barrel section defining a bore communicating with said internal compartment, said barrel section further defining a generally annular recess about said bore;
   (c) an elongate member having an electrical conductor extending therefrom, said elongate member having an integrally formed, enlarged lug section which seats in said recess to secure said elongate member against rotation;
   (d) mechanical means for securing said housing portions together as a unit; and
   (e) at least one electric terminal in said internal compartment connectable to said conductor.

2. The tool of claim 1 wherein said elongate member is a bendable wand member.

3. The tool of claim 2 wherein said wand member includes an electromagnet.

4. The tool of claim 2 wherein said wand member includes a light.

5. The tool of claim 1 wherein said lug section is configured in the shape of a nut having multiple faces.

6. The tool of claim 1 wherein said internal compartment defines a battery-receiving area and said grip defines an access door to said battery.

7. The tool of claim 1 including clip means secured about said barrel section.

* * * * *